US009100640B2

(12) United States Patent
Boross et al.

(10) Patent No.: US 9,100,640 B2
(45) Date of Patent: Aug. 4, 2015

(54) METHOD AND SYSTEM FOR UTILIZING IMAGE SENSOR PIPELINE (ISP) FOR ENHANCING COLOR OF THE 3D IMAGE UTILIZING Z-DEPTH INFORMATION (75) Inventors: Chris Boross, Sunnyvale, CA (US); Nambirajan Seshadri, Irvine, CA (US); Jeyhan Karaoguz, Irvine, CA (US); Xuemin Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 537 days.

(21) Appl. No.: 13/174,430

(22) Filed: Jun. 30, 2011

(65) Prior Publication Data
US 2012/0050484 A1    Mar. 1, 2012

Related U.S. Application Data (60) Provisional application No. 61/377,867, filed on Aug. 27, 2010.

(51) Int. Cl.
*H04N 13/02* (2006.01)
*H04N 13/00* (2006.01)

(52) U.S. Cl.
CPC ......... *H04N 13/025* (2013.01); *H04N 13/0018* (2013.01); *H04N 13/026* (2013.01); *H04N 13/0271* (2013.01)

(58) Field of Classification Search
CPC .............. H04N 13/02; H04N 13/0018; H04N 13/0271; H04N 13/026; H04N 13/025
USPC .......................................................... 348/46
See application file for complete search history.

(56) References Cited

U.S. PATENT DOCUMENTS

| 6,445,833 | B1 * | 9/2002 | Murata et al. .................. 382/285 |
| 7,889,913 | B2 * | 2/2011 | Wells ............................. 382/154 |
| 2003/0035001 | A1 * | 2/2003 | Van Geest et al. ............. 345/753 |
| 2008/0002910 | A1 * | 1/2008 | Ojima et al. ................... 382/277 |
| 2008/0150945 | A1 * | 6/2008 | Wang et al. .................... 345/427 |
| 2009/0201384 | A1 * | 8/2009 | Kang et al. .................. 348/222.1 |
| 2009/0232347 | A9 * | 9/2009 | Plowman et al. ............. 382/100 |

(Continued)

FOREIGN PATENT DOCUMENTS

WO    WO 2007145654 A1 * 12/2007

*Primary Examiner* — Jay Patel
*Assistant Examiner* — Francis G Geroleo
(74) *Attorney, Agent, or Firm* — Brinks Gilson & Lione (57) ABSTRACT A monoscopic video camera may capture, via at least one image sensor, two-dimensional video, and may capture, via at least one depth sensor, corresponding depth information for the captured two-dimensional video. The monoscopic video camera may then configure color related processing of video information corresponding to objects in the captured 2D video based on the captured corresponding depth information. Configuring color processing may comprise setting and/or adjusting color information associated with the objects. In this regard, setting and/or adjusting color information may be based on shadow, shade, and/or edge related information associated with the objects, which may be generated and/or modified based on the captured corresponding depth information based on the captured corresponding depth information. Configuring color processing may be based on surrounding regions adjacent to the objects. The surrounding regions adjacent to the objects may be determined based on the captured corresponding depth information.

20 Claims, 6 Drawing Sheets

(56) References Cited

U.S. PATENT DOCUMENTS

| | | | |
|---|---|---|---|
| 2010/0080485 A1* | 4/2010 | Chen et al. | 382/266 |
| 2010/0091092 A1* | 4/2010 | Jeong et al. | 348/43 |
| 2010/0091097 A1* | 4/2010 | Pockett | 348/54 |
| 2010/0290697 A1* | 11/2010 | Benitez et al. | 382/154 |
| 2011/0074784 A1* | 3/2011 | Turner et al. | 345/427 |
| 2011/0096832 A1* | 4/2011 | Zhang et al. | 375/240.08 |
| 2011/0158504 A1* | 6/2011 | Turner et al. | 382/154 |
| 2011/0285825 A1* | 11/2011 | Tian et al. | 348/47 |
| 2012/0026289 A1* | 2/2012 | Suenaga et al. | 348/44 |

* cited by examiner

METHOD AND SYSTEM FOR UTILIZING IMAGE SENSOR PIPELINE (ISP) FOR ENHANCING COLOR OF THE 3D IMAGE UTILIZING Z-DEPTH INFORMATION

CLAIM OF PRIORITY

This patent application makes reference to, claims priority to and claims benefit from U.S. Provisional Application Ser. No. 61/377,867, which was filed on Aug. 27, 2010.

The above stated application is hereby incorporated herein by reference in its entirety.

CROSS-REFERENCE TO RELATED APPLICATIONS/INCORPORATION BY REFERENCE

This application also makes reference to:
U.S. application Ser. No. 13/174,261 filed on even date herewith;
U.S. application Ser. No. 13/077,900 filed on Mar. 31, 2011;
U.S. application Ser. No. 13/077,912 filed on Mar. 31, 2011;
U.S. application Ser. No. 13/077,922 filed on Mar. 31, 2011;
U.S. application Ser. No. 13/077,886 filed on Mar. 31, 2011;
U.S. application Ser. No. 13/077,926 filed on Mar. 31, 2011;
U.S. application Ser. No. 13/077,893 filed on Mar. 31, 2011;
U.S. application Ser. No. 13/077,923 filed on Mar. 31, 2011;
U.S. application Ser. No. 13/174,364 filed on even date herewith;
U.S. Provisional Application Ser. No. 61/439,201 filed on Feb. 3, 2011;
U.S. application Ser. No. 13/174,344 filed on even date herewith;
U.S. Provisional Application Ser. No. 61/439,209 filed on Feb. 3, 2011;
U.S. application Ser. No. 13/174,370 filed on even date herewith;
U.S. application Ser. No. 13/077,868 filed on Mar. 31, 2011;
U.S. application Ser. No. 13/077,880 filed on Mar. 31, 2011;
U.S. application Ser. No. 13/077,899 filed on Mar. 31, 2011; and
U.S. application Ser. No. 13/077,930 filed on Mar. 31, 2011.

Each of the above stated applications is hereby incorporated herein by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

Certain embodiments of the invention relate to video processing. More specifically, certain embodiments of the invention relate to a method and system for utilizing image sensor pipeline (ISP) for enhancing color of the 3D image utilizing z-depth information.

BACKGROUND OF THE INVENTION

Support and demand for video systems that support three-dimensional (3D) video has increased rapidly in recent years. Both literally and physically, 3D video provides a whole new way to watch video, in home and in theaters. However, 3D video systems are still in their infancy in many ways and there is much room for improvement in terms of both cost and performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing image sensor pipeline (ISP) for enhancing color of the 3D image utilizing z-depth information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing image sensor pipeline (ISP) for enhancing color of the 3D image utilizing z-depth information. In various embodiments of the invention, a monoscopic video camera may be utilized to detect presence of objects at varying depths, and may adaptively configure color related processing of video information associated with each of these objects based on corresponding depth for each for these objects. Color related processing may comprise setting and/or adjusting color relate parameters and/or overall color hue associated with the objects. In this regard, the monoscopic video camera may capture, via at least one image sensor, two-dimensional video, and may capture, via at least one depth sensor, corresponding depth information for the captured two-dimensional video. The monoscopic video camera may then determine presence of objects in the captured two-dimensional video, based on the captured corresponding depth information for example. Once object presence is determined, color related processing of image related information corresponding to the objects may be configured based on corresponding depth information of the object. In this regard, configuring color related processing may comprise setting and/or adjusting color information associated with the object. Setting and/or adjusting color information may be based on, for example, shadow, shade, and/or edge related information associated with the object. At least some of the shadow, shade, and/or edge related information associated with the object may be generated and/or modified based on the captured corresponding depth information based on the captured corresponding depth information.

Configuration of color related processing of image related information associated with objects may be performed based on preset criteria and/or parameters associated with identified types and/or characteristics of the objects. The monoscopic video camera may be operable to synchronize the captured corresponding depth information to the captured two-dimensional video, to enable generating 3D perception for at least some images captured via the monoscopic video camera. Accordingly, the monoscopic video camera may compose three-dimensional video from captured two-dimensional video based on corresponding captured depth information. The monoscopic video camera may then render the composed three-dimensional video, autonomously, utilizing for example an integrated display in the monoscopic video camera, or via another display device, to which the 3D video may be communicated directly from the monoscopic video camera or indirectly via intermediate storage devices.

Figure 1:
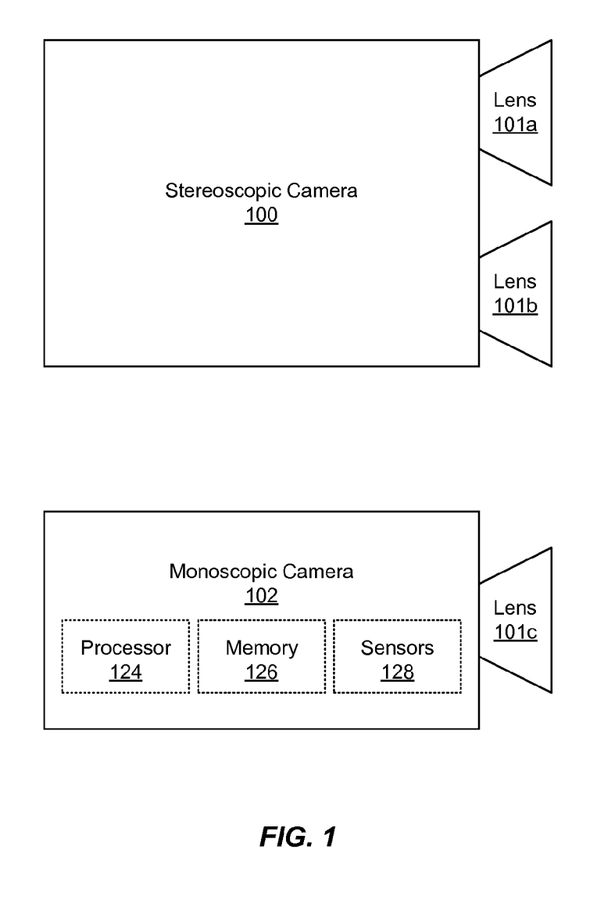
FIG. 1 is a diagram that illustrates an exemplary monoscopic, or single-view, camera embodying aspects of the present invention, compared with a conventional stereoscopic camera.

FIG. 1 is a diagram that compares a monoscopic camera embodying aspects of the present invention with a conventional stereoscopic camera. Referring to FIG. 1, there is shown a stereoscopic camera 100 and a monoscopic camera 102.

The stereoscopic camera 100 may comprise suitable logic, circuitry, interfaces, and/or code that may enable capturing and/or generating stereoscopic video and/or images. In this regard, the stereoscopic camera 100 may comprise two lenses 101a and 101b. Each of the lenses 101a and 101b may capture images from a different viewpoint and images captured via the two lenses 101a and 101b may be combined to generate a 3D image. In this regard, electromagnetic (EM) waves in the visible spectrum may be focused on a first one or more image sensors by the lens 101a (and associated optics) and EM waves in the visible spectrum may be focused on a second one or more image sensors by the lens (and associated optics) 101b.

The monoscopic camera 102 may comprise suitable logic, circuitry, interfaces, and/or code that may enable capturing and/or generating monoscopic video and/or images. In this regard, the monoscopic camera 102 may capture images via a single viewpoint, corresponding to the lens 101c for example. EM waves in the visible spectrum may be focused on one or more image sensors by the lens 101c. The image sensor(s) may capture brightness and/or color information. The captured brightness and/or color information may be represented in any suitable color space such as YCrCb color space or RGB color space. In an exemplary aspect of the invention, the monoscopic camera 102 may be operable to generate 3D video and/or images based on captured 2D video and/or images based on, for example, depth information. In this regard, the monoscopic camera 102 may also capture depth information via the lens 101c (and associated optics). For example, the monoscopic camera 102 may comprise an infrared emitter, an infrared sensor, and associated circuitry operable to determine the distance to objects based on reflected infrared waves. Additional details of the monoscopic camera 102 are described below.

The monoscopic camera may comprise a processor 124, a memory 126, and a sensory subsystem 128. The processor 124 may comprise suitable logic, circuitry, interfaces, and/or code that may be operable to manage operation of various components of the camera and perform various computing and processing tasks. A single processor 124 is utilized only for illustration but the invention is not so limited. In an exemplary embodiment of the invention, various portions of the camera 102 depicted in FIG. 2A below may correspond to the processor 124 depicted in FIG. 1. The memory 106 may comprise, for example, DRAM, SRAM, flash memory, a hard drive or other magnetic storage, or any other suitable memory devices.

The sensory subsystem 128 may comprise suitable logic, circuitry, interfaces, and/or code that may be operable to generate and/or capture sensory related information, such as imaging, color, and/or depth information, and/or to handle at the least some of the processing of sensory information. The sensory subsystem 128 may comprise, for example, a plurality of sensors which may be operable to capture and/or generate video information corresponding to images and/or video streams generated via the monoscopic camera 102, and/or may also comprise additional hardware and/or software that may be utilize in generating and/or performing at least some of processing of the information. In this regard, the sensory subsystem 128 may enable generating 2D video and corresponding depth and/or color information. The sensory subsystem 128 may comprise, for example, one or more image sensors, one or more depth sensors, and one or more sensors. In this regard, exemplary sensors that may be integrated into the sensory subsystem 128 are described in more detail below with respect to FIG. 2A.

In exemplary aspect of the invention, the monoscopic camera 102 may be operable to utilize depth information for enhancing color associated with 3D video and/or images generated based on captured 2D video and/or images. In this regard, color-related video processing may be configured and/or adjusted to enhance coloring related information in captured and/or generated 2D video or images. For example, color related video processing for specific pixels or regions in captured images may be performed and/or configured selectively and/or adaptively, based on depth level associated with these pixels or regions as determined from the depth information for example, as described in more detail below with respect to FIG. 2A.

Figure 2A:
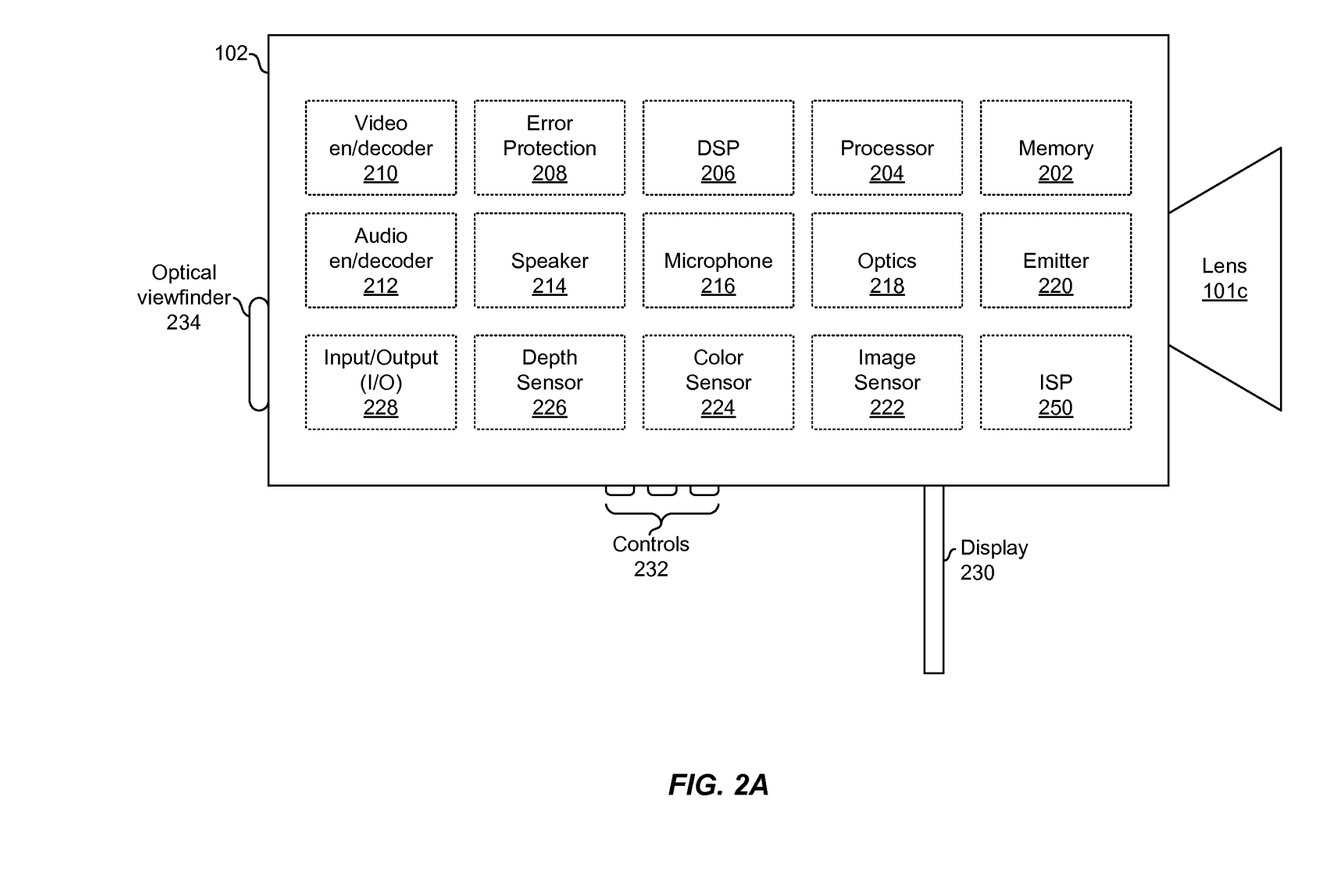
FIG. 2A is a diagram illustrating an exemplary monoscopic camera, which may be utilized in accordance with an embodiment of the invention.

FIG. 2A is a diagram illustrating an exemplary monoscopic camera, in accordance with an embodiment of the invention. Referring to FIG. 2A, there is shown the monoscopic camera 102, which may comprise a memory 202, a processor 204, a digital signal processor (DSP) 206, an error protection module 208, a video encoder/decoder 210, an audio encoder/decoder 212, a speaker 214, a microphone 216, an optics module 218, an emitter 220, an input/output (I/O) module 228, a digital display 230, controls 232, and optical viewfinder 234. The camera 102 may also comprise a plurality of sensors which may be operable to capture and/or generate video information corresponding to images and/or video streams. The camera 102 may comprise, for example, one or more image sensors 222, one or more color sensor 224, and one or more depth sensor 226. The camera 102 may also comprise the lens 101c, which may be operable to collect and sufficiently focus electromagnetic waves in the visible and infrared spectra to enable capturing images and/or video.

The memory 202 may suitable logic, circuitry, interfaces, and/or code that may enable temporary and/or permanent storage of data, and/or retrieval or fetching thereof. The memory 202 may comprise, for example, DRAM, SRAM, flash memory, a hard drive or other magnetic storage, or any other suitable memory devices. For example, SRAM may be utilized to store data utilized and/or generated by the processor 204 and a hard-drive and/or flash memory may be utilized to store recorded image data and depth data. The processor 204 may comprise suitable logic, circuitry, interfaces, and/or code that may be operable to coordinate operation of the various components of the camera 102. The processor 204 may, for example, run an operating system of the camera 102 and control communication of information and signals between components of the camera 102. The processor 204 may execute instructions stored in the memory 202. The DSP 206 may comprise suitable logic, circuitry, interfaces, and/or code that may be operable to perform complex processing of captured image data, captured depth data, and captured audio data. The DSP 206 may be operable to, for example, compress and/or decompress the data, encode and/or decode the data, and/or filter the data to remove noise and/or otherwise improve perceived audio and/or video quality for a listener and/or viewer.

The error protection module 208 may comprise suitable logic, circuitry, interfaces and/or code that may be operable to perform error protection functions for the monoscopic camera 102. For example, the error protection module 208 may provide error protection to encoded 2D video images and corresponding depth information, and/or encoded audio data for transmission to a video rendering device that may be communicatively coupled to the monoscopic camera 102.

The video encoder/decoder 210 may comprise suitable logic, circuitry, interfaces, and/or code that may be operable to process captured color, brightness, and/or depth data to make the data suitable for conveyance to, for example, the display 230 and/or to one or more external devices via the I/O block 228. For example, the video encoder/decoder 210 may convert between, for example, raw RGB or YCrCb pixel values and an MPEG encoding. Although depicted as a separate block, the video encoder/decoder 210 may be implemented in the DSP 206.

The audio encoder/decoder 212 may comprise suitable logic, circuitry, interfaces, and/or code that may be operable to process captured color, brightness, and/or depth data to make the data suitable for conveyance to, for example, the speaker 214 and/or to one or more external devices via the I/O block 228. For example, the video encoder/decoder 210 may convert between, for example, raw pulse-code-modulated audio and an MP3 or AAC encoding. Although depicted as a separate block, the audio encoder/decoder 212 may be implemented in the DSP 206.

The speaker 214 may comprise suitable logic, circuitry, interfaces, and/or code operable to convert electrical signals into acoustic waves. The microphone 216 may be operable to amplify, equalize, and/or otherwise generate audio signals based on audio information generated in the camera 102. The directionality of the speaker 214 may be controlled electronically and/or mechanically.

The microphone 216 may comprise a transducer and associated logic, circuitry, interfaces, and/or code operable to convert acoustic waves into electrical signals. The microphone 216 may be operable to amplify, equalize, and/or otherwise process captured audio signals. The directionality of the microphone 216 may be controlled electronically and/or mechanically.

The optics module 218 may comprise various optical devices for conditioning and directing EM waves received via the lens 101c. The optics module 218 may direct EM waves in the visible spectrum to the image sensor 222 and direct EM waves in the infrared spectrum to the depth sensor 226. The optics module 218 may comprise, for example, one or more lenses, prisms, color filters, and/or mirrors.

Each image sensor 222 may each comprise suitable logic, circuitry, interfaces, and/or code that may be operable to convert optical signals to electrical signals. Each image sensor 222 may comprise, for example, a charge coupled device (CCD) images sensor or a complimentary metal oxide semiconductor (CMOS) image sensor. Each image sensor 222 may capture 2D brightness and/or color information.

Each color sensor 224 may comprise suitable logic, circuitry, interfaces, and/or code that may be operable to detect color generation and/or generate color related information based thereon in images captures via the camera 102.

Each depth sensor 226 may comprise suitable logic, circuitry, interfaces, and/or code that may be operable to detect EM waves in the infrared spectrum and determine distance to objects based on reflected infrared waves. In an embodiment of the invention, distance may be determined based on time-of-flight of infrared waves transmitted by the emitter 220 and reflected back to the color sensor 224. In an embodiment of the invention, depth may be determined based on distortion of a captured grid.

The input/output module 228 may comprise suitable logic, circuitry, interfaces, and/or code that may enable the camera 102 to interface with other devices in accordance with one or more standards such as USB, PCI-X, IEEE 1394, HDMI, DisplayPort, and/or analog audio and/or analog video standards. For example, the I/O module 228 may be operable to send and receive signals from the controls 232, output video to the display 230, output audio to the speaker 214, handle audio input from the microphone 216, read from and write to cassettes, flash cards, hard disk drives, solid state drives, or other external memory attached to the camera 102, and/or output audio and/or video via one or more ports such as a IEEE 1394 or USB port.

The digital display 230 may comprise suitable logic, circuitry, interfaces, and/or code that may enable displaying video and/or images, captured, generated, and/or processed via the monoscopic camera 102. In this regard, the digital display 230 may comprise, for example, an LCD, LED, OLED, or other digital display technology on which images recorded via the camera 102 may be displayed. In an embodiment of the invention, the digital display 230 may be operable to display 3D images. The controls 232 may comprise suitable logic, circuitry, interfaces, and/or code. The controls 232 may enable a user to interact with the camera 102. For example, controls for controlling recording and playback. In an embodiment of the invention, the controls 232 may enable a user to select whether the camera 102 records and/or outputs video in 2D or 3D modes. The optical viewfinder 234 may enable a user to see what the lens 101c "sees," that is, what is "in frame."

In an exemplary aspect of the invention, the camera 102 may comprise an image sensor pipeline (ISP) 250. In this regard, the ISP 250 may be implemented as a dedicated component, and/or as part of another component of the camera 102, such as the processor 202 for example. The ISP 250 may comprise suitable circuitry, logic, interfaces and/or code that may be operable to process imaging (or video) data, which may be received from one or more imaging related sensors, such as image sensors 222, sensor 224, and/or depth sensor 226. In this regard, the ISP 250 may perform and/or support various video processing operations and/or techniques comprising, for example, filtering, demosaic, lens shading correction, defective pixel correction, white balance, image compensation, Bayer interpolation, color transformation, and/or post filtering. The ISP 250 may provide accelerated processing of imaging data. In this regard, the accelerated processing may be achieved by use of pipelined based architecture, with the ISP 250 comprising programmable pipeline structure for example.

The ISP 250 may comprise, for example, multiple sensor processing stages, implemented in hardware, software, firmware, and/or any combination thereof. Exemplary processing stages may comprise demosaicing, geometric distortion correction, color conversion, denoising, and/or sharpening, for example. Furthermore, processing of image data may be performed on variable sized tiles, reducing the memory requirements of the ISP 250 processes. Data may be moved from any point of the ISP 250 and processed in software and the resulting software processed data may be put into any desired point of the ISP 250 for processing in hardware.

In operation, the camera 102 may be utilized to generate 3D video and/or images based on captured 2D video data and corresponding depth information. For example, the depth sensor(s) 226 may capture depth information and the image sensor(s) 222 may capture 2D image information. Similarly, for a lower-end application of the camera 102, such as a security camera, the image sensor(s) 222 may capture only brightness information for rendering black and white 3D video. The depth information may, for example, be stored and/or communicated as metadata and/or an additional layer of information associated with 2D image information. In this regard, a data structure in which the 2D image information is stored may comprise one or more fields and/or indications that indicate depth data associated with the stored 2D image information is available for rendering a 3D image. Similarly, packets in which the 2D image information is communicated may comprise one or more fields and/or indications that indicate depth data associated with the communicated 2D image information is available for rendering a 3D image. Thus, for outputting 2D video, the camera 101 may read the 2D image information out of memory, and process it to generate a 2D video stream to the display and/or the I/O block. For outputting 3D video, may: (1) read the 2D image information from memory; (2) determine, based on an indication stored in memory with the 2D image information, that associated depth information is available; (3) read the depth information from memory; and (4) process the 2D image information and depth information to generate a 3D video stream.

Processing of the 2D image information and depth information may comprise synchronizing the depth information to the 2D image information. Processing of the 2D image information and depth information may comprise scaling and/or interpolating either or both of the 2D image information and the associated depth information. For example, the resolution of the depth sensor 226 may be less than the resolution of the image sensor 222. Accordingly, the camera 102 may be operable to interpolate between pixels of depth information to generate depth information for each pixel, or group of pixels, of 2D image information. Similarly, the frame rate of the depth sensor 226 may be less than the frame rate of the image sensor 222. Accordingly, the camera 102 may be operable to interpolate between frames of depth information to generate a frame of depth information for each frame of 2D image information.

In various embodiments of the invention, the monoscopic camera 102 may be operable to utilize depth information for color enhancement, by configuring and/or adjusting color-related video processing operations to enhance coloring related information in captured and/or generated 2D video or images. In an embodiment of the invention, depth information captured via the depth sensor 226 may be utilized to determine and/or estimate presence of different depth levels in 2D images or video, which may be captured via the image sensor 222. The color processing may then be performed and/or configured selectively, wherein color processing for of color information, generated via color sensor 224 for example, for specific pixels or regions in the images may be performed adaptively based on depth level associated with these pixels or regions, as determined from the depth information.

In an embodiment of the invention, depth information may be utilized, for example, in determining and/or estimating real color corresponding to particular (target) objects in captured images, and/or to enable performing color correction and/or enhancement, to improve 3D perception of generated and/or generated images and/or video. In this regard, color correction and/or enhancement may comprise setting and/or adjusting color related information based on determined or estimated three-dimensional spatial characteristics, such as positioning of surfaces of the target objects relative to the camera for example, and/or based on color related effects attributed to surrounding regions and/or other adjacent objects.

For example, color correction and/or enhancement may be performed based on in accordance with, for example, shading, shadow, and/or edge effects. In this regard, shading based color correction and/or enhancement may comprise adaptively and/or variably setting or adjusting color information associated with different surfaces of the target objects to depict varying shade levels in a manner that further enhance 3D perception of the target objects, wherein certain surfaces may appear to have darker or lighter shade compared to remaining portions of the target objects. For example, shading related color enhancement may comprise adjusting color information such that surfaces facing the camera may have lighter shades whereas surfaces facing sideway (i.e. close to 90° angles relative to the camera) may have darker shades.

Color correction and/or enhancement may also comprise adaptively setting and/or adjusting color information associated with at least portion of the target objects to reflect and/or to account for shadowing effects. For example, color information associated with a target object's, or part thereof may change when the target object is present in shadow of other object(s)—e.g. person in shadow of a tree—and accordingly color correction and/or enhancement may enable adjusting color information based on degree of shadow effects. In this regard, shadowing effects may be determined based on, for example, determination of separation of the objects. Furthermore, object separation may be determined and/or estimated three-dimensionally, based on depth information for example, which may enable determining and/or estimating relative position of both the target object and the object(s) causing the shadowing effects, by determining position and depth of each object relative to the monoscopic camera 102.

Color correction and/or enhancement may also comprise setting and/or adjusting color information associated with edges of target object, to enhance contrasting effects associated with these edges for example. In this regard, edges may comprise both "absolute" edges—i.e., edges associated with boundaries of objects, and edges resulting from overlapping of objects at different depth—i.e. objects closer to the monoscopic camera 102 may partially block parts of other objects further away from the monoscopic camera 102. Accordingly, determining and/or estimating object edges within captured scenes may be performed based on depth information for example.

In an embodiment of the invention, color correction and/or enhancement may comprise generating, based on depth information for example, pixel data comprising color related information associated with "dead pixels." In this regard, dead pixels may comprise pixels in captured images or video for which there is no video data, which may result from errors encountered during capturing of images and/or during processing of the video information associated with the captured images. In this regard, the pixel data may be generated based on surrounding regions and/or objects, which may be selected based on depth information, to ensure that these regions and/or objects are close to and/or at the same depth as the target object comprising the dead pixels.

For example, information corresponding to captured images, as generated by the image sensor 222, may be scanned to find any such dead (or bad) pixels, and this information may be correlated with corresponding color information, as generated by the color sensor 224 and with corresponding depth information, as generated by the depth sensor 226, to enable performing the necessary color related correction.

Figure 2B:
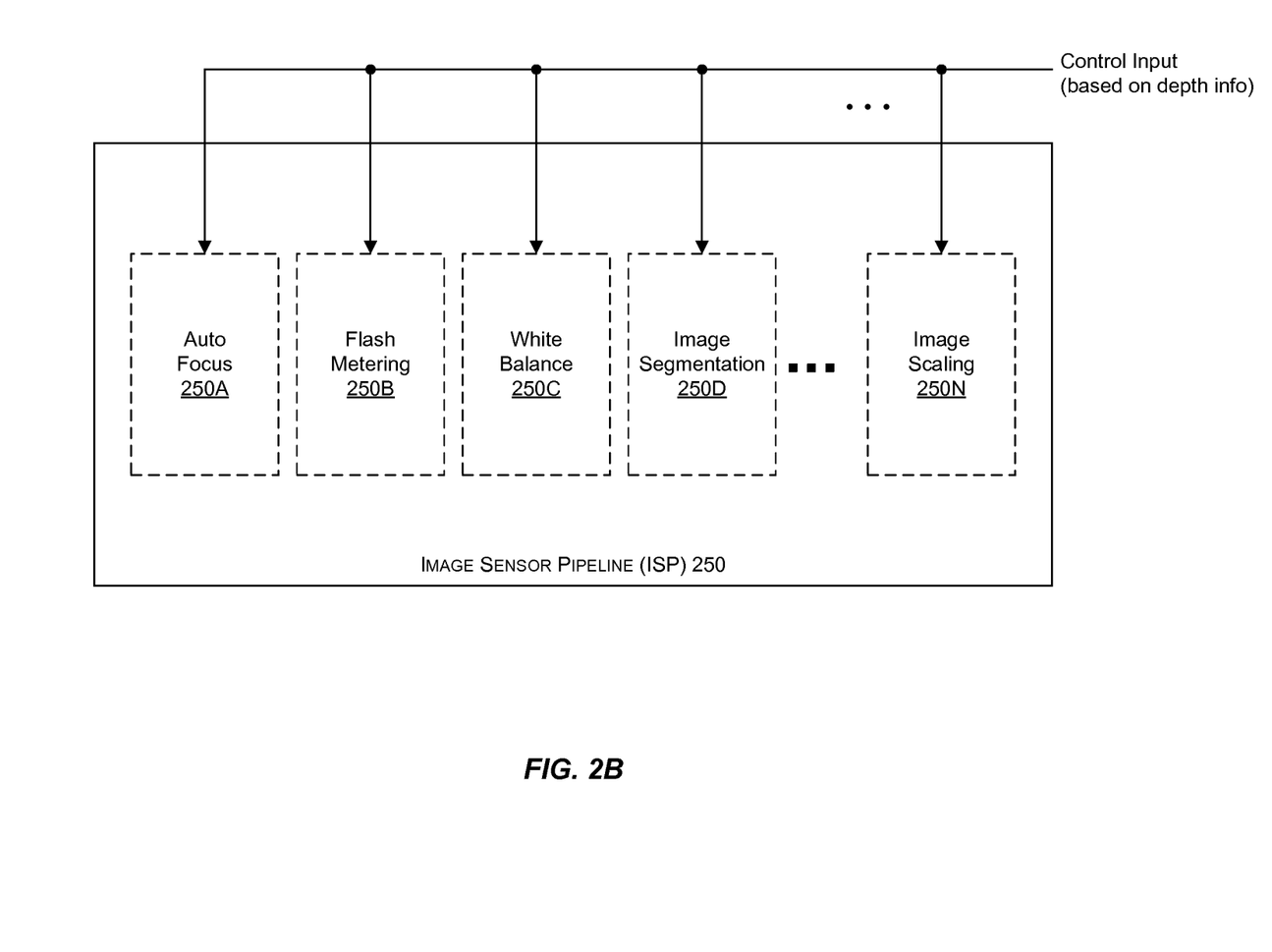
FIG. 2B is a block diagram illustrating an exemplary image sensor pipeline (ISP), which may be utilized in accordance with an embodiment of the invention.

FIG. 2B is a block diagram illustrating an exemplary image sensor pipeline (ISP), which may be utilized in accordance with an embodiment of the invention. Referring to FIG. 2B, there is shown the image sensor pipeline (ISP) 250 of FIG. 2A.

The ISP 250 may comprise suitable circuitry, logic, interfaces and/or code that may be operable to perform various functions associated with processing of imaging data, which may be received from one or more imaging related sensors, in accelerated manner, by use of pipelined based architecture for example. The ISP 250 may be utilized to enable, for example, pipelined color processing of captured images. In this regard, the ISP 250 may be configured as a programmable pipeline structure, comprising a plurality of functions $250_A$-$250_N$, each of which associated with handling and/or performing particular image processing function. Accordingly, the ISP 250 may enable accelerated image processing by splitting the processing of data associated with each particular image into stages, to enable concurrently handling multiple images with each of the plurality of functions $250_A$-$250_N$ being utilized to, for example, perform the corresponding processing function on different images. In other words, ISP 250 may enable handling multiple images since processing of each image may be at different stage at any given point. This may enable implementing various aspects of the invention by adjusting different stages of pipelined functions, without affecting the overall processing duration since some of the operations may be done while other stages are being performed.

Exemplary processing functions handled and/or implemented by the ISP 250 may comprise, for example, auto-focus function $250_A$, flash-metering function $250_B$, auto-white-balance (AWB) function $250_C$, image segmentation function $250_D$, and/or image scaling function $250_N$.

The auto-focus function $250_A$ may comprise performing focusing operations automatically. In this regard, focusing may comprise selecting one or more portions of an image to be focal points during images processing, in which light from these portions and/or objects therein, are optimally captured and/or corresponding image information are consequently very accurate. Auto-focus operations may comprise use and/or control of image sensors to enable selecting focus points, and/or to determine correct focusing associated therewith. In this regard, auto-focus may be active, in which distance to the focus points (or objects) may be determined, and subsequently correct focusing may be effectuated, by controlling and/or adjusting available image sensors, using such techniques as light metering for example. Auto-focus may also be passive, in which focus point selection and/or corresponding focusing adjustment may be performed base don passive analysis of the image, and/or associate image information after the image is captured.

The flash-metering function $250_B$ may comprise controlling flashing operations, such as of the camera 102, based on image sensory information. In this regard, flash-metering may comprise determining and/or measuring levels of light or brightness in a scene with which an image is associated, and selecting and/or controlling based thereon the amount of light emitted by a flash component coupled to and/or integrated into the camera. The light measuring may be performed using one or more sensors, and/or via the camera's lenses.

The AWB function $250_C$ may comprise performing white balance operations automatically. In this regard, white balancing may comprise adjusting color intensities of portions of an image associated with the white color, to ensure that these portions may be render correctly—that is, with more natural feel, based on identification of the objects associated with these white areas and/or settings in which the image was captured. The white color may typically be function of equal, or near equal mixing of the three primary colors (red, green, and blue). Accordingly, during color balancing, contribution or parameters associated with each of these three colors may be adjusted to adjust the whiteness of the white color region. For example, white balancing may comprise adjusting image portions associated with snow such that the white color associated with the snow may be rendered with a degree of blueness.

The image segmentation function $250_D$ may comprise partitioning an image, whose information is processed, into multiple segments, each of comprising a plurality of contagious and/or non-contagious pixels, based on presence of one or more common characteristics among pixels in each segment. The common characteristics may be determined based on predetermined ranges associated with one or more video information, such as intensity and/or color. Image segmentation may be utilized to enable simplifying and/or changing processing image data, by configuring analysis and/or processing of image data in accordance with the common characteristics associated with each segment. Image segmentation may also be utilized to enable and/or enhance locating objects and boundaries, such as lines or curves, in images.

The image scaling function $250_N$ may comprise resizing images, and/or portions thereof, to increase or decrease the image (or portion) size. In this regard, image scaling may comprise and/or pertain to zooming operations, in which a portion of an image may be adjusted to fit larger or smaller portion of screen. Image scaling may affect various characteristics of the mages, such as smoothness and/or sharpness. In this regard, increasing the size of image may reduce the smoothness and/or sharpness in the image, while decreasing the size of image may enhance its smoothness and/or sharpness. Image scaling may comprise subsampling or upsampling an image, or portion thereof based on whether the image (or portion) is being scaled up or down.

In various embodiments of the invention, the depth information, which may be generated and/or captured via the depth sensor 226 for example, may be utilized to enhance and/or improve image processing performed in the camera 102. In this regard, the depth information may be utilized to generate and/or adjust control information utilized in controlling and/or managing operations of the ISP 250. For example, the control information may be utilized to adjust and/or control various stages and/or functions of the ISP 250, such as the auto-focus function $250_A$, the flash-metering function $250_B$, the AWB function $250_C$, the image segmentation function $250_D$, and/or the image scaling function $250_N$. For example, the auto-focus function $250_A$ may be adjusted, based on depth information, to enable selecting focus points, and/or configuring focusing operations relating thereto, adaptively at different depths relative to the camera 102. Also, algorithms utilized during AWB operations may be adjusted to enable applying white balancing adaptively at different depths relative to the camera 102. Similarly, algorithms and/or parameters utilized scaling operations may be adjusted to enable performing scaling operations adaptively at different depths relative to the camera 102.

Figure 3:
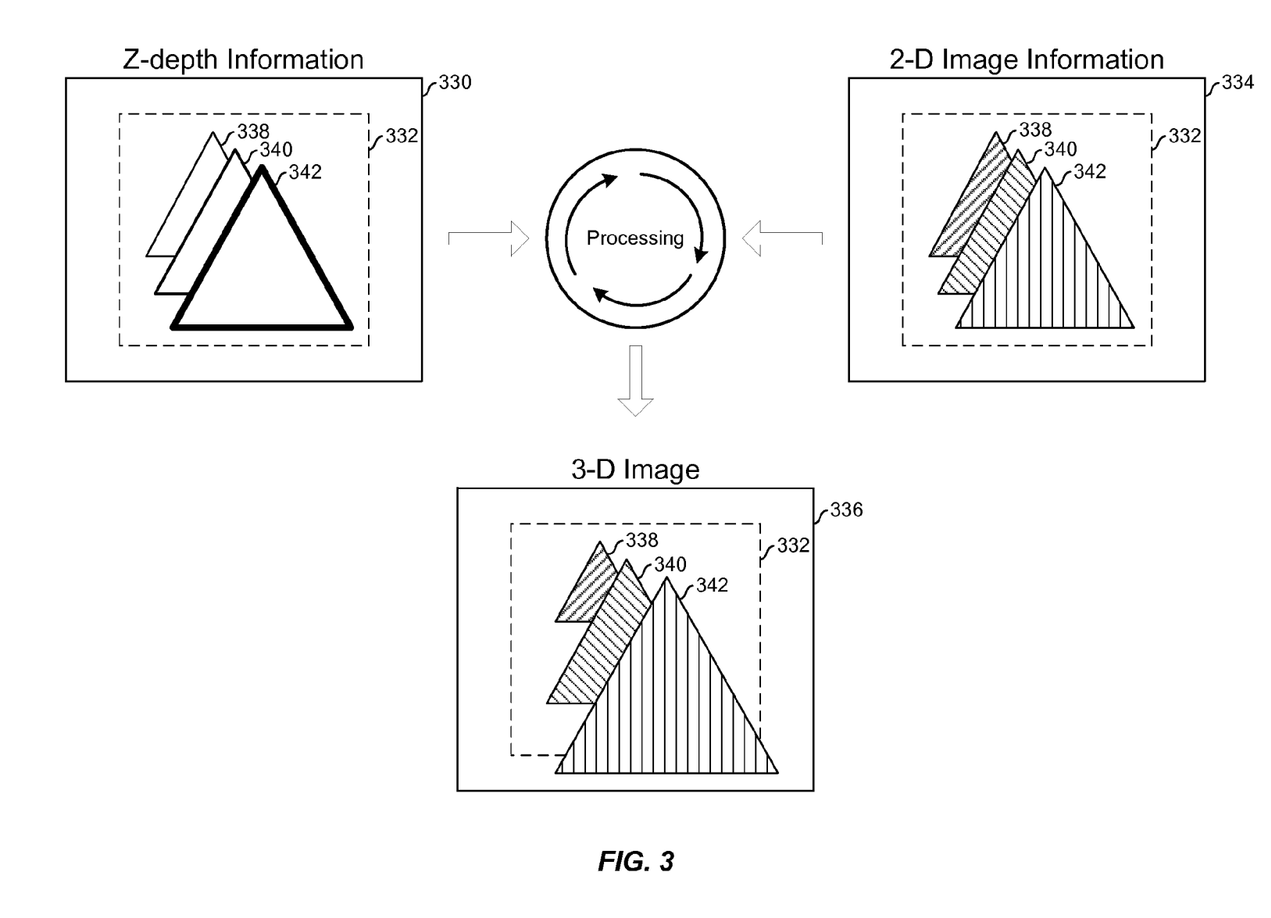
FIG. 3 is a diagram that illustrates exemplary processing of depth information and 2D image information to generate a 3D image, which may be utilized in accordance with an embodiment of the invention.

FIG. 3 illustrates processing of depth information and 2D image information to generate a 3D image, which may be utilized in accordance with an embodiment of the invention. Referring to FIG. 3, there is shown a frame 330 of depth information, which may be captured by the depth sensor(s) 226, and a frame 334 of 2D image information, captured by the image sensors 222. In this regard, the depth information 330 and the 2D image information 334 may be processed to generate a frame 336 associated with a corresponding 3D image. Also shown in FIG. 3 is plane 332, indicated by a dashed line, which is merely for illustration purposes to indicate depth on the two dimensional drawing sheets.

In the frame 330, the line weight is utilized to indicate depth—heavier lines being closer to the viewer. Thus, the object 338 is farthest from the camera 102, the object 342 is closest to the camera 102 and the object 104 is at an intermediate distance.

In operation, depth information, such as in frame 330 for example, may be utilized to provide depth related adjustments to corresponding 2D video information, such as in frame 334 for example. For example, the depth information may be mapped to a grayscale, or pseudo-grayscale, image for display to the viewer. Such mapping may be performed by the DSP 206 for example. The image associated with the frame 334 may be a conventional 2D image. A viewer of the frame 234, for example on the display 120 or on a dedicated display device connected to the camera 102 via the I/O module 228, may perceive the same distance to each of the objects 338, 340, and 342. That is, each of the objects 338, 340, and 342 each appear to reside on the plane 332.

Accordingly, 2D video information and corresponding depth information may be processed to enable generating 3D images, associated with frame 336 for example, which may provide depth perception when viewed. For example, the depth information of frame 330 may be utilized to adaptively adjust video information with each of objects in the 2D images of frames 334 to create perception of different depths for objects contained therein. In this regard, the viewer of frames 336, on the display 120 or on a dedicated display device connected to the camera 102 via the I/O module 228 for example, may perceive the object 338 being furthest from the viewer the object 342 being closest to the viewer, and the object 340 being at an intermediate distance. In this regard, the object 338 may appear to be behind the reference plane, the object 340 may appear to be on the reference plane, and the object 342 may appear to be in front of the reference plane.

In an exemplary aspect of the invention, depth information may be utilized in configuring and/or controlling color processing when generating 3D images, such as instances of frame 336 for example. In this regard, depth information corresponding to frame 330 may be utilized to determine and/or estimate presence of different objects 338, 340, and 342 at different depth levels. Accordingly, processing of color information in 2D image information frame 334 associated with object 338, 340, and 342 may be configured such that color information associated with each object may be set and/or adjusted separately and/or adaptively, to enable modifying color information associated with each of the objects 338, 340, and 342 in frame 336 to enhance color-related 3D perception when frame 336 is viewed, substantially as described with regard to FIG. 2A for example. The color related adjustments may incorporate, for example, shading, shadowing, and/or edge related adjustments.

Figure 4:
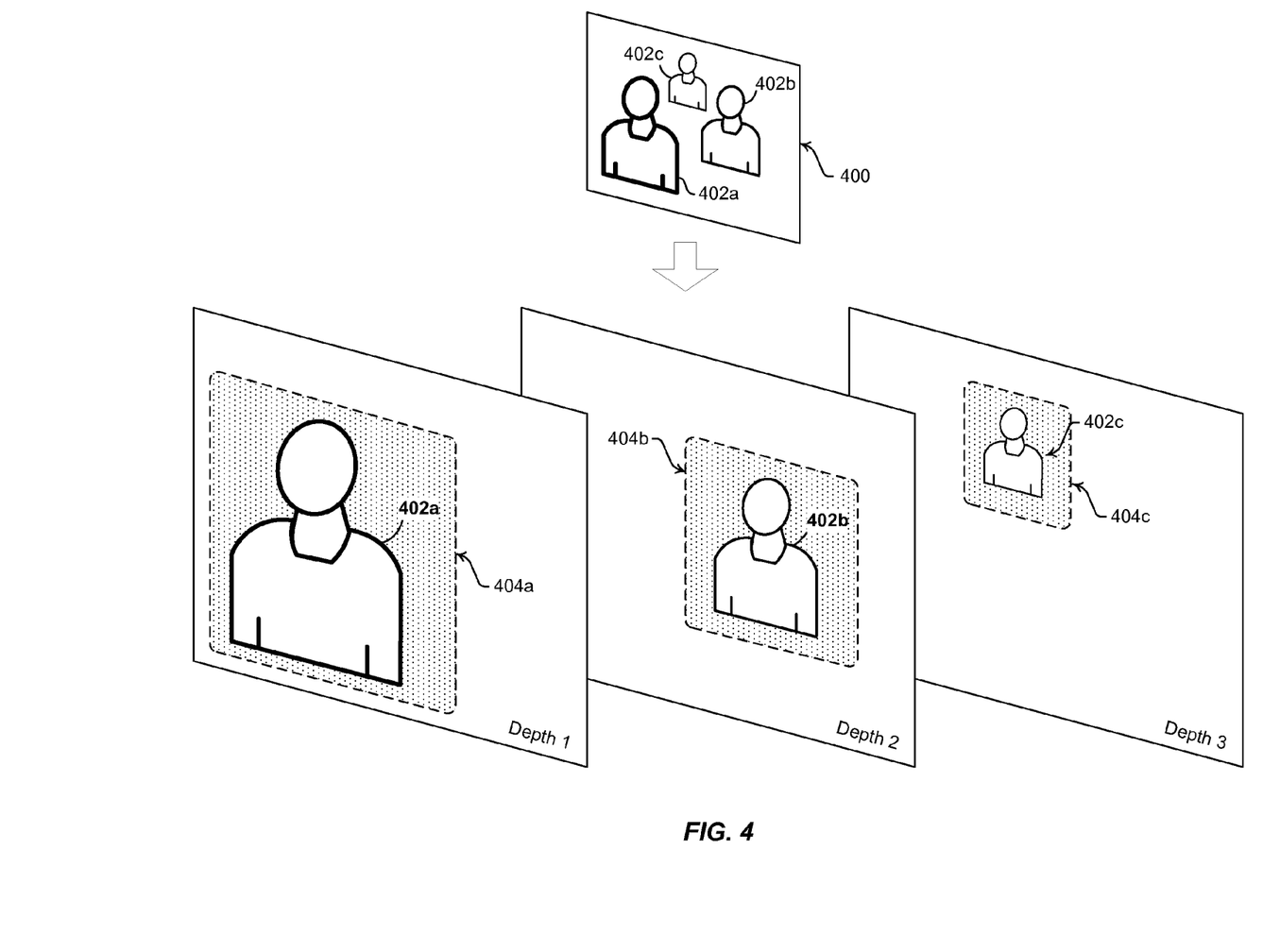
FIG. 4 is a diagram that illustrates exemplary selective processing of objects via monoscopic camera based on Z-depth information to enable adaptive color enhancement, which may be utilized in accordance with an embodiment of the invention.

FIG. 4 is a diagram that illustrates exemplary selective processing of objects via monoscopic camera based on Z-depth information to enable adaptive color enhancement, which may be utilized in accordance with an embodiment of the invention. Referring to FIG. 4, there is shown an image frame 400 which may be captured and/or processed via the monoscopic camera 102 for example. The image frame 400 may comprise video information corresponding to a plurality of objects, such as objects 402a, 402b, and 402c. In this regard, objects 402a, 402b, and 402c may be located at difference depths relative to a reference point, which may correspond to, for example, location of the monoscopic camera 102 at the time when the image frame 400 is generated.

In operation, the monoscopic camera 102 may utilize depth information captured and/or generated at the time the image frame 400 is generated for enhancing color processing of various elements therein, such as the objects 402a, 402b, and 402c. For example, based on depth information, the monoscopic camera 102 may be operable to determine different depth level at which each of the objects 402a, 402b, and 402c is located, as shown in FIG. 4. Furthermore, the monoscopic camera 102 may be operable to determine based on depth information, for each of the objects 402a, 402b, and 402c, surrounding region within the corresponding depth level, as represented by shaded areas 404a, 404b, and 404c, respectively.

In an exemplary aspect of the invention, during processing of video data associated with each of the objects 402a, 402b, and 402c, color processing may be controlled and/or managed, based on depth information for information, to enable enhancing color information associated with each of the objects 402a, 402b, and 402c. For example, once depth level associated with each object is determined, a specific surrounding region, such as one of regions 404a, 404b, or 404c may be utilized in adjusting and/or setting color information associated with each of the objects 402a, 402b, and 402c. In this regard, the color processing enhancement and/or correction may comprise setting and/or adjusting color information associated with edges between each of the objects 402a, 402b, and 402c and each of the regions 404a, 404b, or 404c, respectively, substantially as described with regard to FIG. 2A for example.

Figure 5:
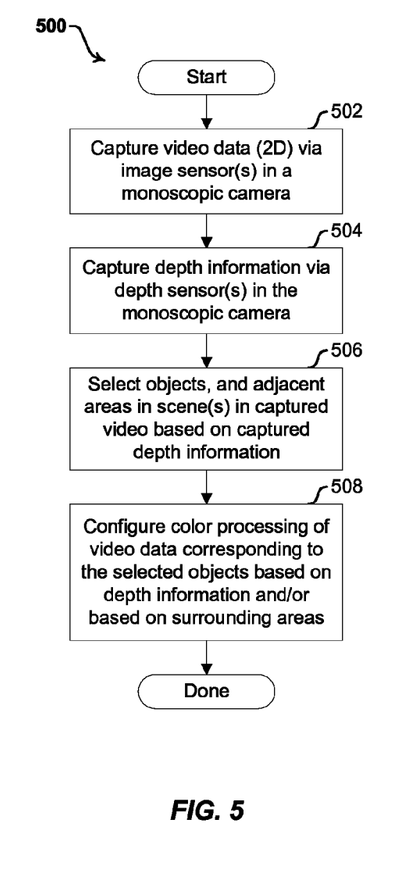
FIG. 5 is a flow chart that illustrates exemplary steps for utilizing image sensor pipeline (ISP) for enhancing color of the 3D image utilizing z-depth information, in accordance with an embodiment of the invention.

FIG. 5 is a flow chart that illustrates exemplary steps for utilizing image sensor pipeline (ISP) for enhancing color of the 3D image utilizing z-depth information, in accordance with an embodiment of the invention. Referring to FIG. 5, there is shown a flow chart 500 comprising a plurality of exemplary steps that may be performed to enable performing utilizing image sensor pipeline (ISP) for enhancing color of the 3D image utilizing z-depth information during video processing.

In step 502, 2D video data may be captured via image sensor(s) of a monoscopic camera. In step 504, depth information may be captured, via depth sensor(s) of the monoscopic camera for example. In this regard, the captured depth information may correspond to the captured 2D video. In step 506, one or more objects may be detected in scene(s) in the captured video, based on captured depth information for example. Furthermore, one or more adjust objects and/or regions may be determined for each detected object. In step 508, processing of color information associated with each detected object may be configured and/or modified, based on depth information and/or based on adjacent objects and/or regions, substantially as described with regard to FIG. 2A for example. In this regard, configuring color related processing may incorporate adaptive and/or selective color adjustment and/or corrections, to incorporate shadowing, shading, and/or edge related modifications for example. In this regard, at least some of the adaptive and/or selective color adjustment and/or corrections may be performed by modifying and/or adjusting settings of various stages and/or functions in the ISP 250.

Various embodiments of the invention may comprise a method and system for utilizing image sensor pipeline (ISP) for enhancing color of the 3D image utilizing z-depth information. The monoscopic video camera 102 may be utilized to detect, via one or more image sensors 222, color sensors 224, and/or depth sensors 226 for example, presence of objects at varying depths, and may adaptively configure color related processing of video information associated with each of these objects based on corresponding depth for each for these objects. Color related processing may comprise setting and/or adjusting color relate parameters and/or overall color hue associated with the objects. In this regard, controlling color processing may comprise adjusting and/or controlling one or more functions $250_A$-$250_N$ in the ISP 250. The monoscopic video camera 102 may capture, via image sensors 222 and/or color sensors 224, two-dimensional video, and may capture, via depth sensor 226, corresponding depth information for the captured two-dimensional video. The monoscopic video camera 102 may then determine presence of objects in the captured two-dimensional video, based on the captured corresponding depth information for example. Once object presence is determined, color related processing of image related information corresponding to the objects may be configured based on corresponding depth information of the object. In this regard, configuring color related processing may comprise setting and/or adjusting color information associated with the object. Setting and/or adjusting color information may be based on, for example, shadow, shade, and/or edge related information associated with the object. At least some of the shadow, shade, and/or edge related information associated with the object may be generated and/or modified based on the captured corresponding depth information based on the captured corresponding depth information. Configuration of color related processing of image related information associated with objects may be performed based on pre-set criteria and/or parameters associated with identified types and/or characteristics of the objects. The monoscopic video camera 102 may be operable to synchronize the captured corresponding depth information to the captured two-dimensional video, to enable generating 3D perception for at least some images captured via the monoscopic video camera 102.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing image sensor pipeline (ISP) for enhancing color of the 3D image utilizing z-depth information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    capturing via at least one image sensor of a monoscopic video camera, a two-dimensional video;
    capturing via at least one depth sensor of said monoscopic video camera, corresponding depth information for said captured two-dimensional video; and
    enhancing color processing of video data associated with at least one object in said captured two-dimensional video based on said captured depth information, wherein enhancing said color processing comprises:
        determining a depth level of the at least one object based on the captured depth information;
        identifying a region surrounding the at least one object in said captured two-dimensional video, the region being at said depth level of the at least one object; and
        adjusting color information associated with edges of said at least one object and the edges of the region based on the identified region at the said depth level of said at least one object.

2. The method according to claim 1, wherein said enhancing of color processing comprises adjusting and/or controlling one or more functions in an image sensor pipeline (ISP) utilized during image processing in said monoscopic video camera.

3. The method according to claim 1, comprising setting and/or adjusting color information associated with said at least one object based on said enhancing of said color processing.

4. The method according to claim 1, comprising performing said enhancing of color processing based on shadow, shade, and/or edge related information associated with said at least one object.

5. The method according to claim 4, comprising generating and/or modifying at least some of said shadow, shade, and/or edge related information associated with said at least one object based on said captured corresponding depth information.

6. The method according to claim 1, comprising determining said surrounding regions adjacent to said at least one object based on said captured corresponding depth information.

7. The method according to claim 1, comprising composing three-dimensional video from said captured two-dimensional video based on said captured corresponding depth information.

8. The method according to claim 7, comprising rendering said composed three-dimensional video via a display that is communicatively coupled to said monoscopic video camera.

9. The method of claim 1, wherein enhancing said color processing further comprises:
identifying a dead pixel within said at least one object; and
generating color for the dead pixel based on the identified region at the said depth level of said at least one object.

10. The method according to claim 1, further comprising determining an orientation of the at least one object in the two-dimensional video, the orientation being determined using the captured depth information; and
adjusting a shade level of color information in the object according to the orientation of the object relative to the image sensor.

11. A system, comprising:
one or more circuits for use in a monoscopic video camera that comprises at least one image sensor and at least one depth sensor, said one or more circuits being operable to:
capture via said at least one image sensor of the monoscopic video camera, a two-dimensional video;
capture via said at least one depth sensor of said monoscopic video camera, depth information corresponding to said captured two-dimensional video;
identify, from among a plurality of objects in said captured two-dimensional video, a first object being in a shadow of at least a second object of said objects;
determine a first depth level of said first object based on said depth information;
determine a second depth level of said second object based on said depth information;
determine a region adjacent to the first object in the two-dimensional video, the adjacent region comprising pixels associated with said first depth level; and
enhance color of said first object in said shadow, wherein said enhancement comprises adjustment of color of an edge between said first object and said adjacent region, said adjustment based on a difference between said first depth level said second depth level.

12. The system according to claim 11, wherein said one or more circuits comprise an image sensor pipeline (ISP), and said one or more circuits are operable to, for said enhancement of color, control and/or adjust one or more functions in said image sensor pipeline (ISP) during image processing in said monoscopic video camera.

13. The system according to claim 11, wherein said one or more circuits are operable to set and/or adjust color information associated with said first object based on said enhancement of color.

14. The system according to claim 11, wherein said one or more circuits are operable to perform said enhancement of color based on shadow, shade, and/or edge related information associated with said first object, wherein said shadow, shade, and/or edge related information is based on said captured depth information.

15. The system according to claim 11, wherein said one or more circuits are operable to determine said adjacent region based on said captured depth information.

16. The system according to claim 11, wherein said one or more circuits are operable to synchronize said captured depth information to said captured two-dimensional video.

17. The system according to claim 11, comprising composing three-dimensional video from said captured two-dimensional video based on said corresponding depth information.

18. The system according to claim 17, wherein said one or more circuits are operable to render said composed three-dimensional video via a display that is communicatively coupled to said monoscopic video camera.

19. A device comprising:
an image sensor configured to capture a two-dimensional image;
a depth sensor configured to capture depth information corresponding to the captured two-dimensional image;
a processor configured to identify a pixel in the two-dimensional image for which color data is absent;
the processor configured to determine a depth level corresponding to the pixel based on the captured depth information;
the processor configured to determine an adjacent region surrounding the pixel, the adjacent region comprising pixels with the depth level of the pixel;
the processor configured to determine an orientation of an object in the two-dimensional image that includes the pixel, the orientation determined using the corresponding depth information;
the processor configured to generate color data for the pixel based on color data of the pixels in the adjacent region; and
the processor configured to adjust a shade level of the generated color data of the pixel in the object according to the orientation of the object relative to the device.

20. The device of claim 19, wherein the processor is further configured to:
detect the object being in a shadow of another object in the two-dimensional image; and
adjust the shade level of the pixel further to compensate for the shadow.

* * * * *